United States Patent [19]

Ulm et al.

[11] Patent Number: 5,608,728

[45] Date of Patent: Mar. 4, 1997

[54] SYSTEM AND METHOD FOR EQUALIZATION OF FORWARD AND REVERSE CHANNELS OF A COMMUNICATION NETWORK SYSTEM

[75] Inventors: John Ulm, Pepperell; William D. Corley, Foxborough; Cynthia Mazza-Brennan, West Newbury; Christopher Grobicki, Andover, all of Mass.

[73] Assignee: LANcity Corp., Andover, Mass.

[21] Appl. No.: 421,612

[22] Filed: Apr. 13, 1995

[51] Int. Cl.⁶ .................................. H04L 12/403
[52] U.S. Cl. .................. 370/488; 370/489; 375/229
[58] Field of Search ................. 370/85.2, 85.1, 370/85.3, 60, 95.1, 94.1; 340/825.5, 825.51, 825.05; 455/6.1, 82; 375/354, 365, 229, 232

[56] References Cited

U.S. PATENT DOCUMENTS

| | | | |
|---|---|---|---|
| 4,757,460 | 7/1988 | Bione et al. ........................ | 370/85.3 |
| 5,347,304 | 9/1994 | Moura et al. ....................... | 348/12 |
| 5,448,590 | 9/1995 | Kostic ................................ | 375/232 |

Primary Examiner—Wellington Chin
Assistant Examiner—Melissa Kay Carman
Attorney, Agent, or Firm—Hale and Dorr

[57] ABSTRACT

A system and method for equalization for forward and reverse channels of communicating highway network system having a branching tree topology. The system and method cause the forward channel to be adjusted first for equalization, then the reverse channel is adjusted for equalization. A reference node periodically transmits a frequency-rich signal on the network to the head end, which broadcasts this signal to each of a number of system nodes. Each system node compares the frequency-rich signal with an expected signal, and adjusts its receiver based on this comparison. Next, each system node transmits another frequency-rich signal to the head end, receives a return echo, compares the echo with the transmitted signal, and adjusts its transmitter based on the comparison.

19 Claims, 7 Drawing Sheets

5,608,728

SYSTEM AND METHOD FOR EQUALIZATION OF FORWARD AND REVERSE CHANNELS OF A COMMUNICATION NETWORK SYSTEM

FIELD OF THE INVENTION

This present invention relates to improving the quality of signals transmitted among nodes in a network. More specifically, the present invention relates to equalization to improve the quality of signals transmitted among system nodes in a network.

BACKGROUND OF THE INVENTION

A Community Antenna Television (CATV) system, often referred to simply as cable TV, typically is based on a branching tree network topology as representatively shown in FIG. 1. In accordance with this topology, the CATV system has a head end which receives signals from source programming and transmits these signals over the network. A trunk system forms a main artery for carrying the programming signals to subscribers.

This branching tree topology, in principle, is adaptable to expand interactive communications capabilities that are now available for communications highway network systems. One such system is described in U.S. Pat. No. 5,471,474 titled "Communications Highway Network System." This interactive system uses the distribution system of a CATV system infrastructure and a large number of system nodes that connect to the distribution system to establish a network.

Each system node of the network system described in U.S. Pat. No. 5,471,474 includes a CPU module for controlling the system node, an RF modem module for interfacing the system node to the distribution system, and a power supply. In this system, one of the system nodes acts as a system pacer/allocator which provides, among other things, global sychronization for all system nodes, and controls access to the network bus. The network system also uses channels of the CATV system for its transmissions between system nodes. These channels are considered the network bus. The network bus, which is used for communications between system nodes, has a forward channel and a reverse channel for two-way transmissions of information.

There long has been a desire to have equalization on the forward and reverse channels so that high quality signals are received by the system nodes. High quality signal transmission over the network provides a basis for expanded uses of the data transmitted on the network.

Transmissions over the network between the transmitter of one system node and the receiver of another system node experience path impairments, such as amplitude tilt, group delay error, signal reflections, and path loss. These impairments are different for transmissions between any specific transmitter-receiver pair because each transmitter-receiver pair is connected to the head end by a unique path. One way to compensate for these impairments is with packet-to-packet adaptive equalization, in which a node uses a preamble in each received packet to make adjustments. Such a process, however, is susceptible to problems due to noise and collisions on the network. Another problem is that an equalization training pattern must be available in each packet, thus increasing overhead. To overcome this, significant hardware additions are needed.

SUMMARY OF THE INVENTION

The present invention is a system and method for providing equalization on the forward and reverse channels of a communications highway network system. Accordingly, the transmitters and receivers of the system nodes operable on the network are adapted to provide quality signals, regardless of their location on the network.

The communications highway network system that may use the present invention preferably has a head end, a plurality of system nodes, and a network bus which connects the system nodes. One of the system nodes on the network is a reference node which carries out the duties of the pacer/allocator for global synchronization and bus access, as described in U.S. Pat. No. 5,471,474. The reference node according to the present invention has additional duties as will be discussed.

The reference node and each of the system nodes has a modem which preferably includes a transmitter, a receiver, a microprocessor, and a storage device. The microprocessor for each system node adjusts its transmitter and receiver to achieve equalization of the forward and reverse channels.

To equalize the forward and reverse channels, the microprocessor of each modem first adjusts the receivers to equalize the forward channel, and then adjusts the transmitters to equalize the reverse channel. For every transmitter that is adjusted, the head end receives signals that have substantially the same characteristics even though the various transmitters have different and unique path impairments between the respective transmitter and the head end. Once equalization is complete, signals of good quality can be transmitted from any transmitter to any receiver, notwithstanding unique impairments along the operative transmission paths.

In carrying out the method of the present invention, the reference node, which as stated is one of the system nodes, periodically transmits a frequency-rich signal on the network to the head end. The head end broadcasts this signal to each of the system nodes. Each node receives the frequency-rich signal and compares it with an expected value of the frequency-rich signal. The receiver is then adjusted based on the comparison.

After the receivers are adjusted, each system node adjusts its transmitter. To make this adjustment, each system node transmits another frequency-rich signal to the head end and waits for a return echo. Each system node then compares the echoed signal with the transmitted signal, and adjusts its transmitter based on this comparison.

By making adjustments to the receivers, such receivers counteract distortion in forward channels from the head end to the system nodes. By making adjustments to the transmitter, transmitted signals are "pre-distorted" to compensate, at least in part, for expected distortions in the reverse channel. This results in equalization on both the forward and reverse channels, even though the signals are distorted in different ways by different transmission paths.

Other features and advantages will become apparent from the following detailed description, claims, and drawings.

DETAILED DESCRIPTION OF DRAWINGS

The present invention is a system and method for equalizing the forward and reverse transmissions paths for a communication highway network system. Although the system and method of the present invention are described as being used with a communications highway network system that may be incorporated into a CATV system, this system and method can be used with any type of system having a branching tree topology that requires equalization of forward and reverse channels, even a stand-alone system.

Figure 1:
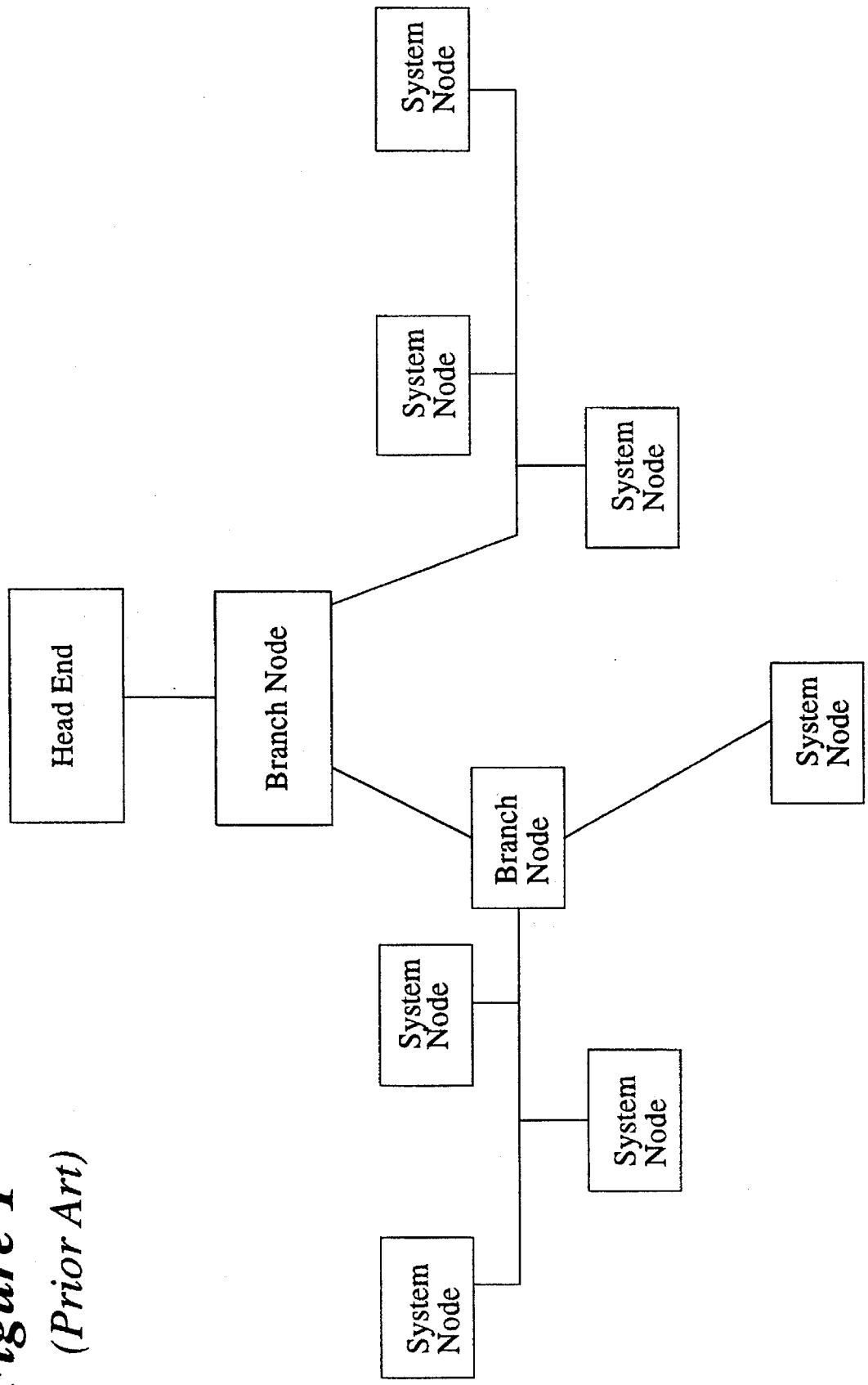
FIG. 1 is a block diagram of a prior art branching tree network topology for a CATV system.
Figure 2:
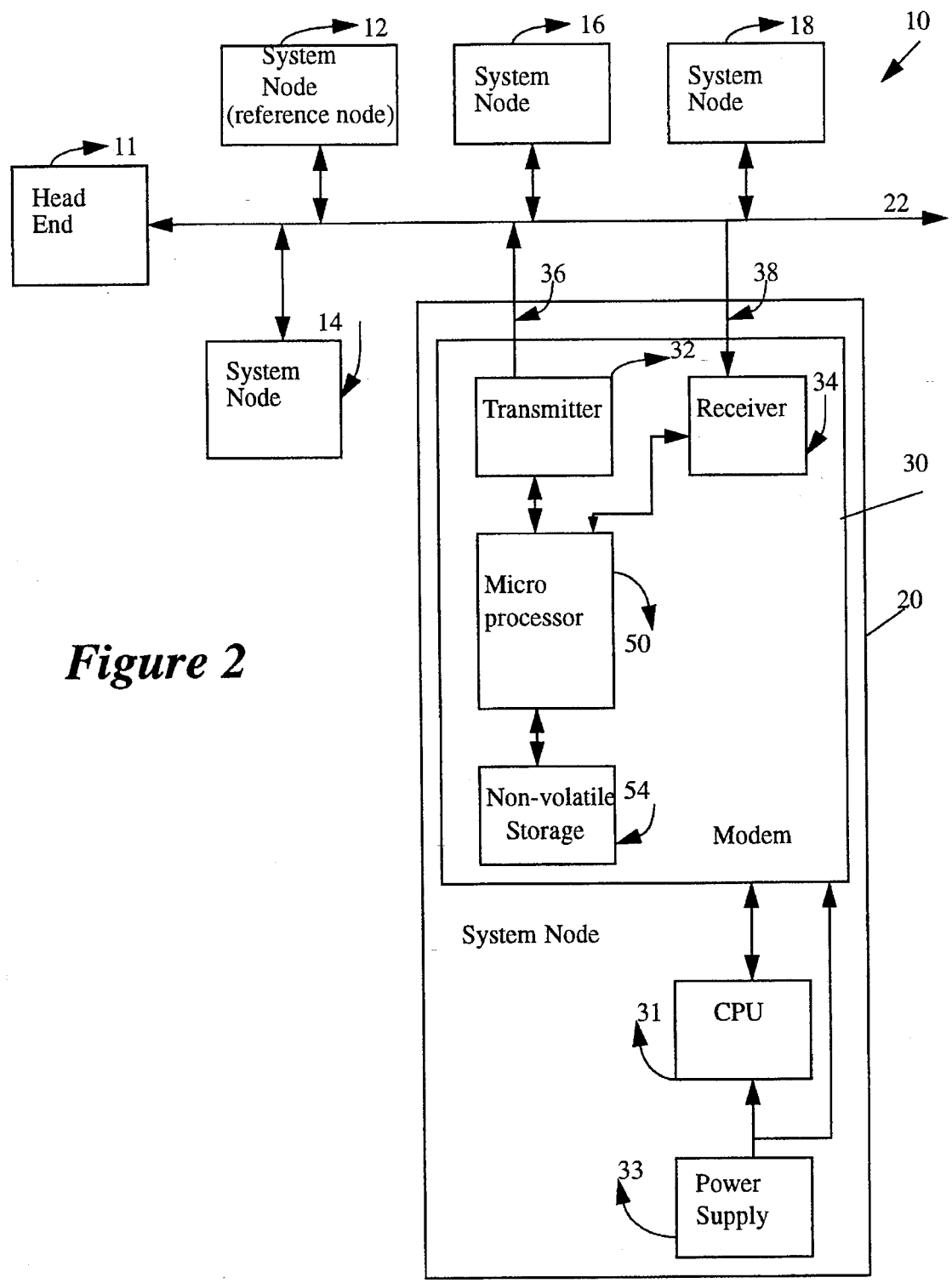
FIG. 2 is a block diagram of a network system incorporating the present invention.

Referring to FIG. 2, communication highway system network 10 has a branching tree topology. As shown, the network includes system node 12, system node 14, system node 16, system node 18, system node 20, and head end 11. Preferably, head end 11 is capable of receiving signals from, and transmitting signals to, system nodes 12, 14, 16, 18, and 20 over network bus 22.

System node 12, for purposes of channel equalization, is referred to as the reference node. Although system node 12 is the reference node, any of the system nodes can be the reference node for purposes of the system and method of the present invention.

Representative system node 20 will be described in detail. Each of the other system nodes, including the reference node 12, has a similar construction. System node 20 includes CPU 31, RF modem 30, and power supply 33. Referring particularly to modem 30, transmitter 32 and receiver 34 are connected to network bus 22, which, in turn, is connected to head end 11. Microprocessor 50 is connected to both transmitter 32 and receiver 34. Nonvolatile storage 54 connects to microprocessor 50. Transmitter 32 of any system node can transmit to the receiver of any other system node through the head end. As shown, reverse channel 36 and forward channel 38 are represented as separate lines, these channels can be a single line.

Figure 3:
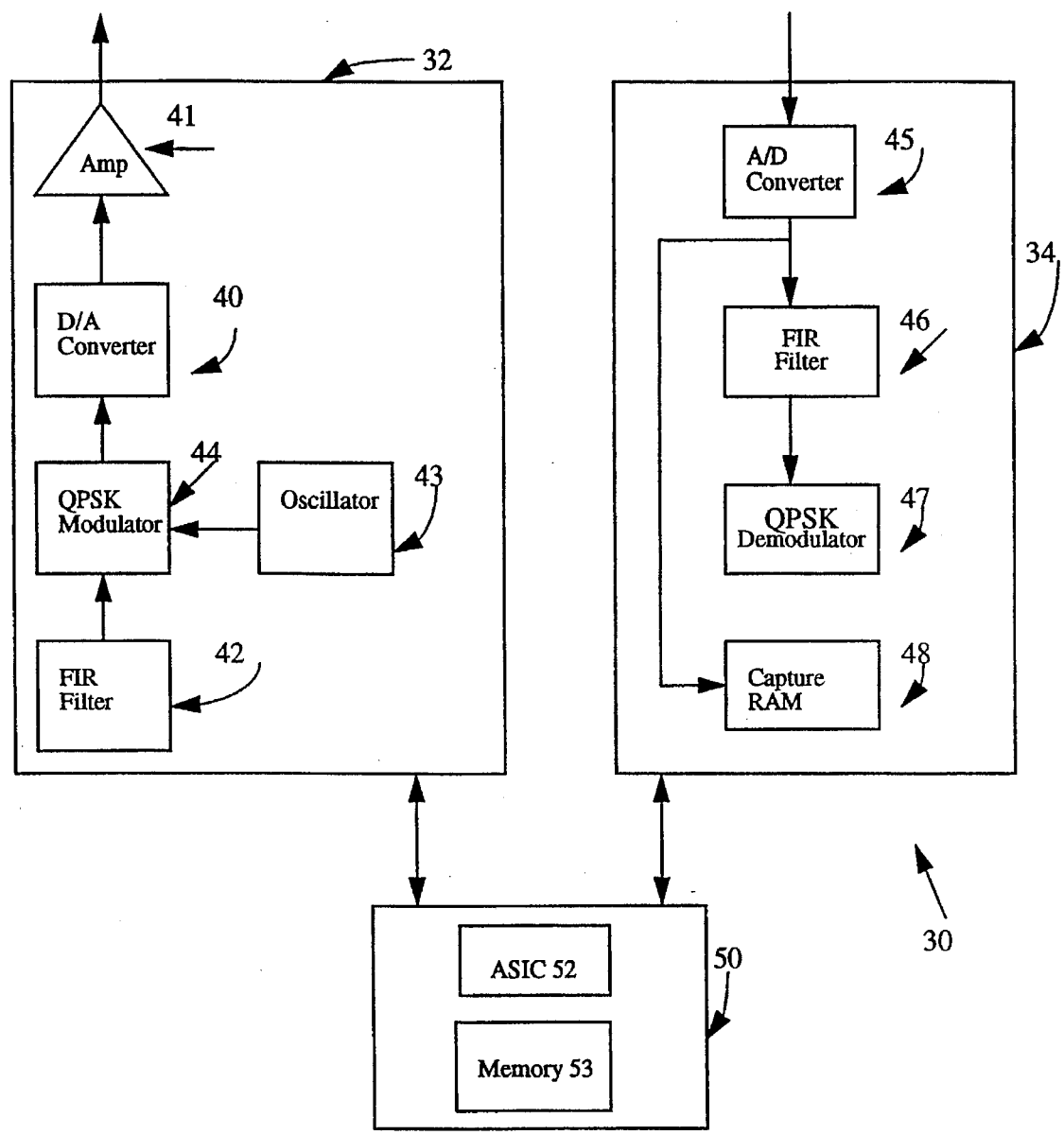
FIG. 3 is a block diagram of the transmitter, receiver, and processor of a modem of a system node.

Referring to FIG. 3, transmitter 32 and receiver 34 are shown in greater detail along with a portion of microprocessor 50. Microprocessor has its own memory 53 which may be used for storing predetermined signals that are used for comparison to signals received over the network. Preferably, transmitter 32 has high speed digital/analog ("D/A") converter 40, output amplifier 41, FIR filter 42, and oscillator 43 that are connected as shown. Digital FIR filter 42 operates based on adjustable coefficients. These coefficients are adjusted to equalize the reverse channel for a particular system node. Signals transmitted from a system node, such as system node 20, are mixed with a carrier signal that is generated by numerically controlled oscillator 43, which has a sine and cosine generator. This mixing takes place in QPSK modulator 44. QPSK modulator 44 is controlled by application specific integrated circuit (ASIC) 52. The modulated signal output from QPSK modulator 44 is processed by D/A converter 40, and then processed by output amplifier 41. The D/A converter provides adequate signal-to-noise ratio (SNR) over the entire frequency band.

Receiver 34 has A/D converter 45, which receives and converts input analog signals from the network, QPSK demodulator 47, which demodulates the carrier and the data signal, FIR filter 46, and capture RAM 48. FIR filter 46 also operates based on adjustable coefficients.

The path between the transmitter of one system node and the receiver of each of the large plurality of other system nodes is unique. Consequently, signals transmitted from a transmitter in one node to a receiver in another node are subject to different and unique impairments. The present system and method adjust the transmitters and receivers via the coefficients of their respective FIR filters so that the signals received at the head end from any transmitter have substantially the same characteristics, regardless of the origin of the signal. Therefore, the signals received by the destination receivers are high quality signals, regardless of which transmitter sends the signal. This system and method will now be explained in detail.

Figure 4:
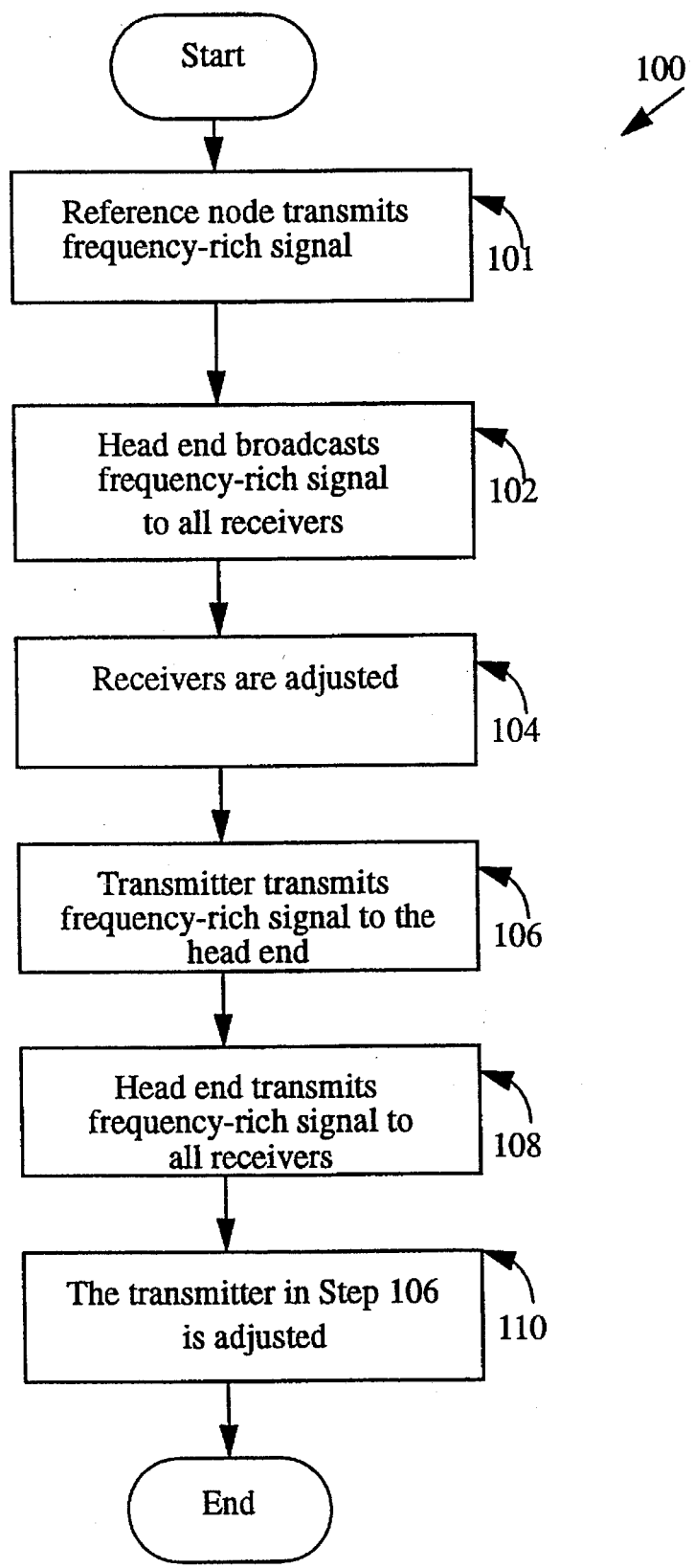
FIGS. 4–6 are flow diagrams illustrating the method for equalization of the forward and reverse channels according to the present invention of a network system.

Referring to FIG. 4, a flow diagram of the steps of the method of the present invention are shown generally at 100. According to this method, at first step 101, reference node 12 transmits a frequency-rich signal to the head end. It is convenient (but not required) for the reference node to be located near head end 11 because the distortion in transmissions from the reference node to the head end is minimized. At second step 102, the head end 11 broadcasts the frequency-rich signal over the network to all receivers of the various system nodes. At third step 104, the receivers at each of the system nodes are adjusted to compensate for the distortion in the frequency-rich signal based on a comparison between an expected representation of the transmitted signal and the received signal.

Step 106 is the fourth step. At this step, each transmitter transmits a frequency-rich signal to the head end. This signal is used to adjust only the transmitting transmitter. According to fifth step 108, the head end retransmits the frequency-rich signals on the network to all the receivers of the system nodes, one of which is the system node that transmitted the frequency-rich signal. At sixth step 110, the system node of interest receives the return echo and compares it with the signal that was transmitted in accordance with step 106. The difference in these signals is used to adjust the transmitter. After having carried out these method steps both the forward and reverse paths for each system node, are equalized.

Figure 5:
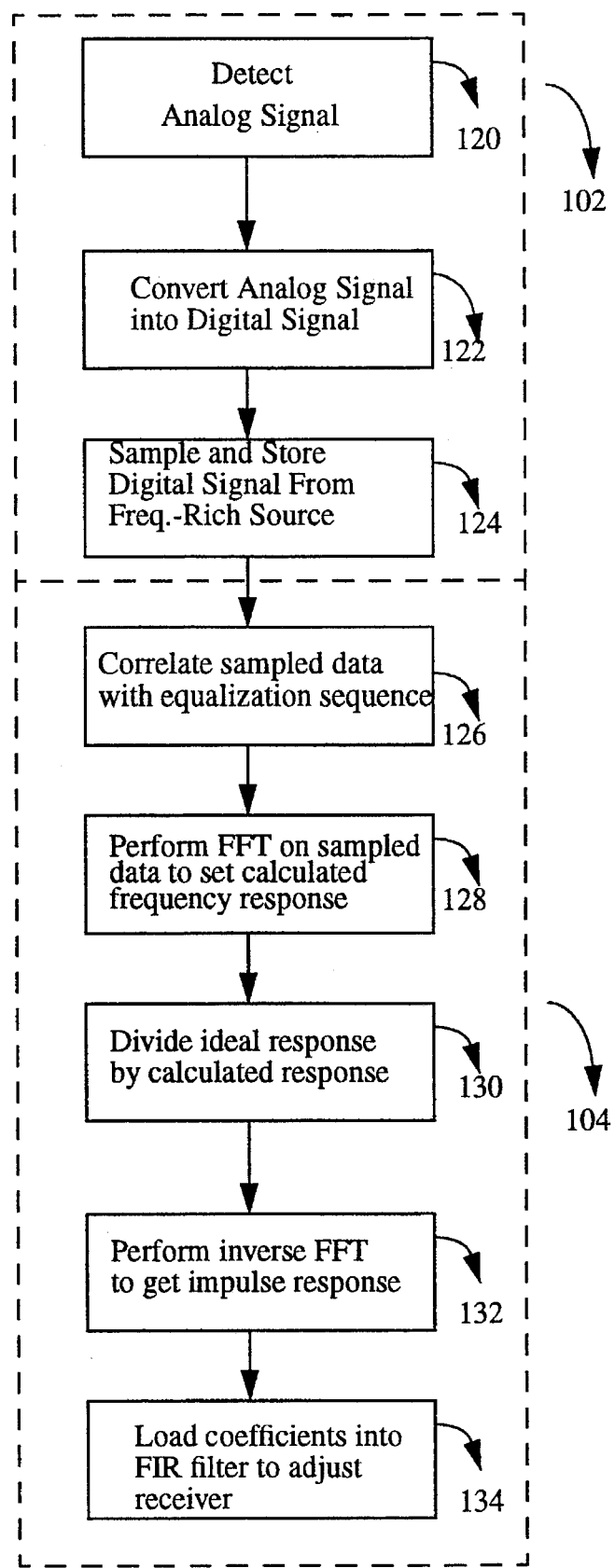
Figure 6:
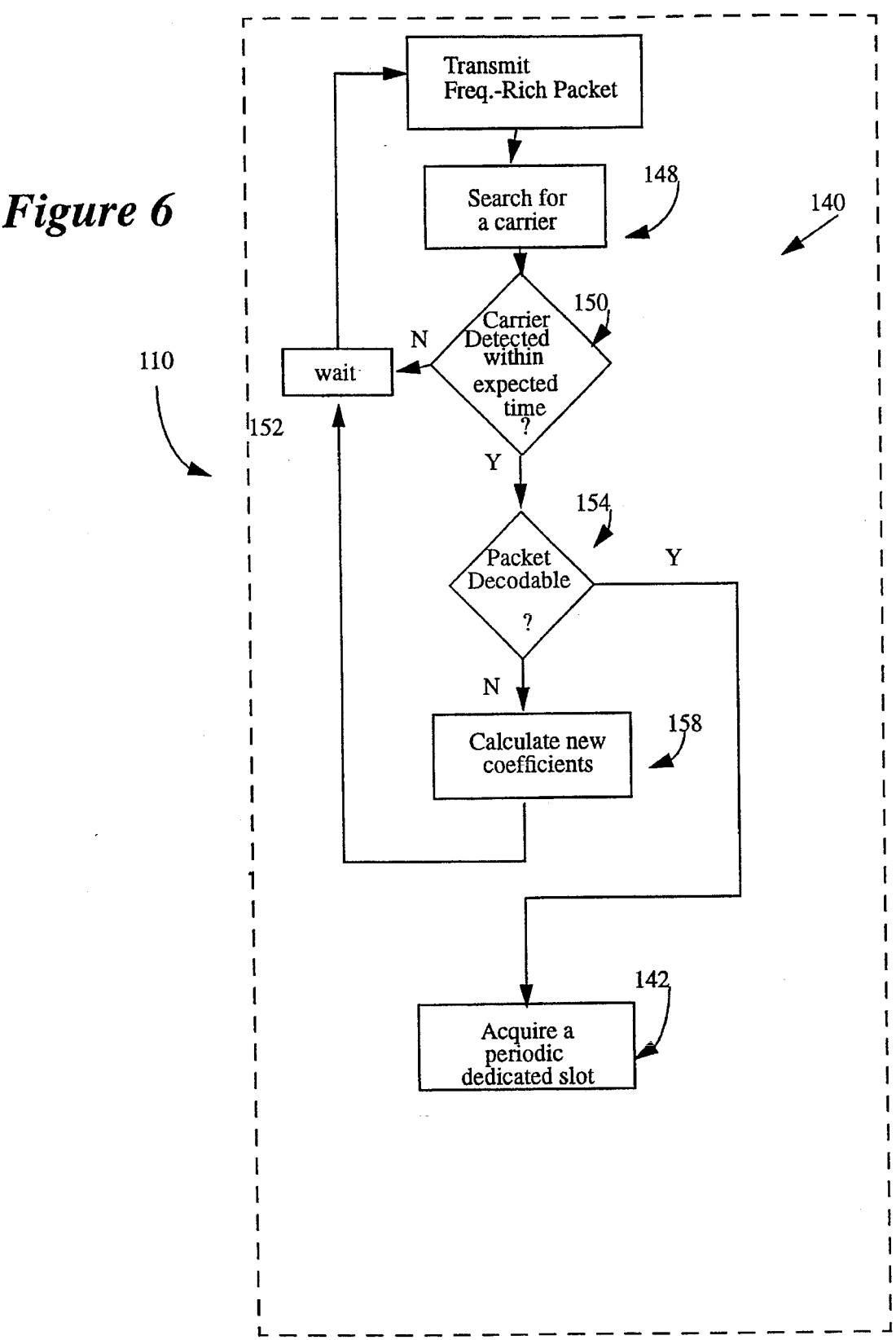

Referring to FIGS. 5 and 6, the method steps shown in FIG. 4 will now be described in greater detail. In step 101, reference node 12 transmits a frequency-rich signal at a known time in a block of transmitted data. In one embodiment, the frequency-rich signal is a 63 symbol sequence that is repeated at least 2 times. This frequency-rich signal preferably is evenly spread across the relevant frequency band. In step 102 in FIG. 5, receiver 34 detects the frequency-rich signal that is broadcast by the head end (substep 120). The frequency-rich signal, which is an analog signal, is converted to a digital signal in A/D converter 45 in receiver 34 (substep 122). After this, the converted signal is filtered by FIR filter 46 and then demodulated in QPSK demodulator 47. The converted signal is also stored in capture RAM 48 (substep 124). The data stored in RAM 48 is used to calculate the coefficients of FIR filter 46. These coefficients enable QPSK modulator 47 to operate properly. Microprocessor 50, which preferably has at least one ASIC, ASIC 52, accesses the data stored in capture RAM 48.

Preferably, 256 samples of the signal sequence output from A/D converter 45 are stored in capture RAM 48. The 256 samples constitute 64 symbols since there are four samples for each symbol. Since the sequence of 63 symbols repeats at least two times, it does not matter where the sampling starts, provided that the number of sampled symbols is greater than the length of the sequence (and provided that the sampling begins before the last time the sequence is transmitted).

With reference to step 104, the actual adjustment of the receiver will be discussed in detail. Microprocessor 50 adjusts the receiver, preferably by calculating coefficients in software programmed in ASIC 52, and by then updating FIR filter 46 in receiver 34 with these coefficients. To do this, microprocessor 50 correlates the received and stored sampled data with the known frequency-rich signal to determine if the received signal is (or is supposed to be) the frequency-rich signal (substep 126). After this, microprocessor 50 performs a fast fourier transform (FFT) on the known and received signals to set the calculated frequency response (substep 128). In substep 130, the calculated received frequency response is divided into the ideal frequency response of the known signal. An inverse FFT is then performed on the result of substep 130 to determine an impulse response (substep 132). Lastly, the coefficients that resulted from substep 132 are loading into FIR filter 46 to adjust the receiver (substep 134).

The system node verifies the accuracy of the receiver coefficients by sampling the output of QPSK demodulator 47 in receiver 34 during a subsequent equalization sequence. The system node calculates the mean and standard deviation of the sampled data to obtain an error vector. If the error vector is beyond a predetermined threshold, equalization has not been achieved. However, during the times when the error vector is within the threshold, each system node should be able to receive clear signals from every other node in the network for any purpose.

After the receiver is adjusted, each system node adjusts its transmitter. Equalizing a reverse path is generally more complicated than equalizing a forward path because the reverse channel (from the system node to the head end) tends to be more corrupted than the forward channel.

Like the frequency-rich signal that was used to adjust the receivers, the frequency-rich transmitter equalization signal that is used for adjusting the transmitters preferably has 63 symbols that are repeated at least two times. Head end 11 echoes the transmitter equalization signal back to receiver 34. The node receives the echo of its own transmitter equalization signal, and saves 256 samples of the received transmitter equalization signal in capture RAM 48 as described.

Microprocessor 50 compares the received signal to the transmitted signal and adjusts transmitter 32 based on this comparison. This adjustment is made preferably by calculating coefficients in a manner similar to that described above, and then updating FIR filter 42 in transmitter 32 with the new calculated coefficients. If desired, the system node can verify the adjustments by sending a second frequency-rich signal, and carrying out the same process with regard to the transmitter.

The method for adjusting the transmitter is similar to the method for adjusting the receiver, with certain exceptions that will now be discussed. In step 110 for adjusting the transmitter, the system node acquires a periodic dedicated time slot in which to transmit its frequency-rich signal for transmitter equalization in a collision-tree environment. After the system node acquires this periodic dedicated time slot, it continues to use this slot to check and verify its adjustments.

Referring to FIG. 6, substep 140 is shown. This substep is part of step 110. A frequency-rich signal including a carrier with a modulated data packet is transmitted. According to substep 140, the system node searches for a carrier with appropriate characteristics (substep 148) to identify the existence of a transmitted signal echo. This carrier has unique characteristics so that it is readily detectable. The system node, such as system node 20, waits up to a maximum time to receive an echo of the signal back from head end 11. There are three possible results with regard to the transmitted signal:

(1) if the system node cannot detect the career within an expected time (substep 150), the node (i) assumes there was a collision, (ii) waits a waiting time (substep 152), and (iii) retries by transmitting another frequency-rich packet;

(2) if the node detects the carrier within an expected time (substep 150) and can decode the data packet (substep 154), the node proceeds to step 142 without modifying its transmitter coefficients; and (3) if the node detects the carrier within an expected time (substep 150) but cannot decode the data packet associated with the carrier (substep 154), the system node (i) assumes that the associated packet was its own, (ii) calculates new transmitter coefficients (substep 158), (iii) waits a waiting time (step 152), and (iv) retries the process of transmitting a frequency-rich packet and searching for a carrier (step 148). When a packet is decodable, the system node proceeds to substep 142.

For waiting step 152, different types of back-off algorithms can be used, including an Ethernet-like binary exponential back-off or a tree algorithm back-off like that used in DQRAP. Although the two back-off methods just described may be used in the present invention, other methods may be used and be within the scope of the present invention.

At substep 142, the system node acquires a periodic dedicated slot in order to transmit its transmitter equalization signal in a collision-free environment to complete the transmitter equalization process. To accomplish this, the system sets aside two distinct regions of the bandwidth. The first region is a region for periodically transmitting the transmitter equalization sequence, and the second region serves as a "bid" time that allows a transmitter to try to acquire a periodic region. Each periodic region is identified by a sequence ID number. The number of sequence IDs is larger than the number of nodes in the network.

To acquire a periodic region, a system node listens and waits until it detects an empty region. The system node saves the sequence ID for that region, and then transmits its carrier and associated data packet in the next bid region. If the system node detects the echo of its own associated data packet, it means that there was no collision and that the system node now "owns" the periodic region with that sequence ID. The system node uses this collision-free transmission to transmit its transmitter equalization signal, and to transmit its carrier and associated data packet in that particular periodic region to maintain ownership of the region and to perform periodic verification of the transmitter.

Once system node 20 completes its receiver and transmitter equalization processes, microprocessor 50 stores all of the pertinent information in local non-volatile storage 54 (FIG. 2). This pertinent information includes transmitter coefficients, receiver coefficients, receiver frequency found, transmitter power level, and a flag indicating that these parameters have been saved. These stored parameters are accessed by microprocessor 50 as a starting point to begin the receiver equalization process (steps 100–104) after a reset. If, after a reset, a receiver equalization process is successfully completed with the stored parameters, the node begins the transmitter equalization process (substep 140), except that the node does not update its transmitter coefficients.

If the system node does not detect its own carrier and associated data packet, it is assumed that this failure must have been caused by a collision and the system node backs off and retries. If the system node still cannot detect its own data packet after a certain maximum number of retries, the system node assumes that there has been system changes and restarts the equalization process from an initial state. In a typical case in which a system node is power cycled and the cable characteristics have not noticeably changed, the system node only needs to transmit and detect a single carrier and associated data packet without a collision in order to move to substep 142.

If a system node does not know its receiving frequency, it selects a starting frequency and listens for a carrier within a suitable time. If it does not successfully detect the carrier, the node selects a new frequency and retries until it is successful. Once the system node successfully samples an equalization sequence, it performs the receiver equalization process (steps 100–104). This process may indicate that the receiver frequency is off by a small amount, in which case the system node adjusts its receiver frequency and samples again. If, after the receiver equalization process is complete, the node is still unable to determine that the receiver frequency is appropriate, the system node selects a new frequency and starts looking all over again. This is repeated until the frequency is found.

Figure 7:
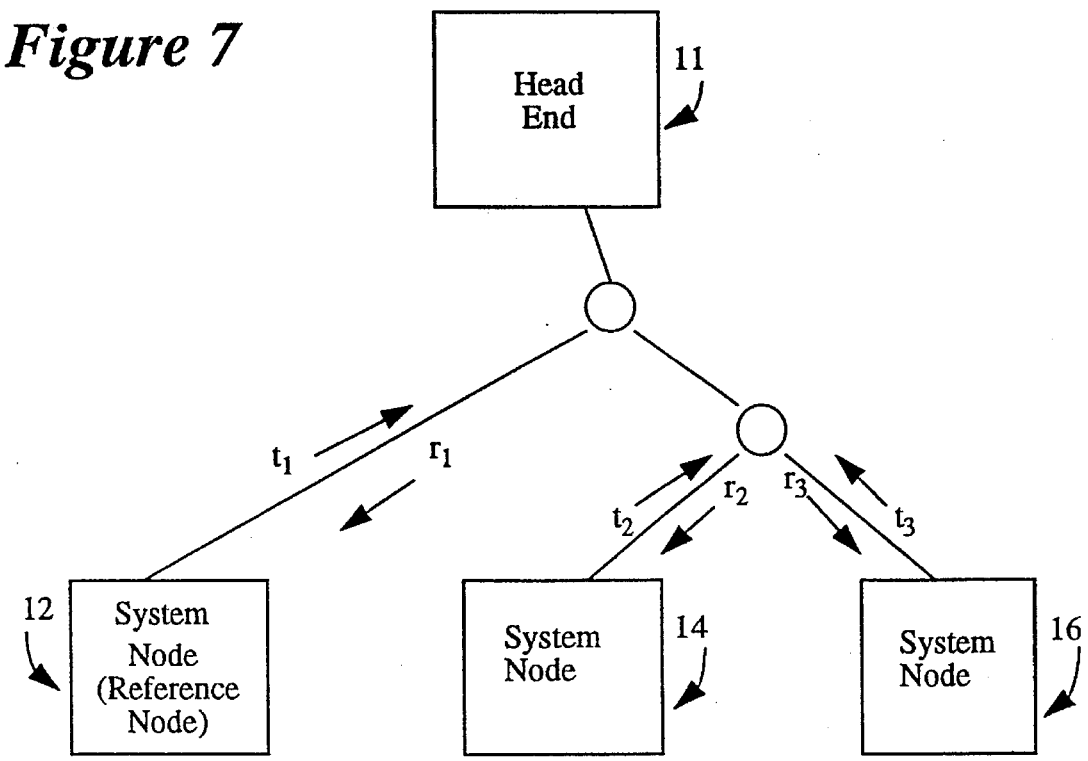
FIG. 7 is a schematic block diagram illustrating different path distortions for a network system.

Referring to FIG. 7, an example is provided to demonstrate the process described above and to illustrate an example of adjustments that can be made in transmitters and receivers. In this example, head end 11 transmits to reference node 12, system node 14, and system node 16. In FIG. 7, $t_N$ and $r_N$ refer to a function of distortion for node N along a transmitter path (reverse channel) and receiver path (forward channel), respectively. As an example, without adjustment, if a signal S is sent from the transmitter of system node 14 to head end 11, the head end receives the signal $(S)(t_2)$. If the head end transmits this signal to system node 16, the system node 16 receives a signal $(S)(t_2)(r_3)$.

Referring also to the flow chart in FIG. 4 in describing the method according to FIG. 7, reference node 12 transmits a frequency-rich signal to head end 11, which, in turn, broadcasts that signal to each of the system nodes in the network including the reference node. The frequency-rich signal is distorted by $t_1$ as it is transmitted from reference node 12 to head end 11. The distortion between head end 11 and system nodes 12, 14, and 16 are each unique to the respective nodes, and are represented as $r_1$, $r_2$, and $r_3$, respectively. Accordingly, the distortion of the frequency-rich signal for each node is the product of $t_1$ and the respective distortion from head end 11 to the nodes, i.e., for nodes 12, 14, and 16, the total distortion is $(t_1)(r_1)$, $(t_1)(r_2)$, and $(t_1)(r_3)$, respectively. To compensate for this distortion, the receiver performs an inverse of these distortion functions as indicated in Table 1.

TABLE 1

| Node | t | r |
| --- | --- | --- |
| Node 1 | 1 | $\frac{1}{(t_1)(r_1)}$ |
| Node 2 | $\frac{t_1}{t_2}$ | $\frac{1}{(t_1)(r_2)}$ |
| Node 3 | $\frac{t_1}{t_3}$ | $\frac{1}{(t_1)(r_3)}$ |
| Node N | $\frac{t_1}{t_N}$ | $\frac{1}{(t_1)(r_N)}$ |

Since the adjustment to the receiver of the reference node takes into account reverse channel distortion $t_1$ and forward channel distortion $r_1$, the transmitter of the reference node need not be adjusted. System nodes 14 and 16, however, each transmit a frequency-rich signal which is received and used to adjust the transmitter (steps 106–110 in FIG. 4). For system node 14, the frequency-rich signal is distorted by $(t_2)(r_2)$. Because the receiver adjusts by $1/(t_1)(r_2)$, the product results in a signal that is distorted by $t_2/t_1$. To compensate for this distortion, the transmitter in system node 14 is adjusted to "pre-distort" the transmitted signal by $t_1/t_2$. Similarly, system node 16 adjusts the transmitter to pre-distort by $t_1/t_3$. Since $t_1$ is preferably small, the amount of pre-distortion may be minor in many cases.

Returning to the example of transmission from system node 14 to system node 16, signal S is pre-distorted by $t_1/t_2$ and is distorted by $t_2$. Therefore, the head end receives $(S)(t_1/t_2)(t_2)=(S)(t_1)$. The signal $(S)(t_1)$ is distorted $r_3$ on the reverse channel, and system node 16 adjusted by $1/(t_1)(r_3)$. Multiplying these functions, system node effectively receives signal S.

While this example has been shown for a very simplified version with only three system nodes, it can easily be seen that if generalized to a large number of system nodes, each system node N would have a transmitter adjustment of $t_1/t_N$, and a receiver adjustment of $1/(t_1)(r_N)$.

Because signals from the reference node to the head end are distorted by $t_1$ due to the path, signals from the system nodes are pre-distorted by the transmitters proportionally to $t_1$, and signals from the system nodes are adjusted inversely proportionally for distortions in the particular transmission paths, the amplitude and delay of all signals should be identical at the head end. In other words, the head end should receive substantially identical signals from all the transmitters if they transmit the same signal.

In a network, because characteristics vary over time and most of these changes are slow in nature, each system node periodically checks its receiver and transmitter for any significant changes in equalization.

The system of the present invention can adjust for various different impairments, including power level variations. A method for dynamically detecting and adjusting the power can be performed at the same time as the equalization process described above. To adjust the power, a node samples the power of its own carrier and associated data packet when verifying its transmitter equalization, and samples the power level of another predetermined broadcast carrier and associated data packet. If the received power of its own data packet is sufficiently different from the received power of the broadcast data packet, the system node adjusts its transmitter to adjust the power level, and then verifies the power level on the next transmit verification. Thus, the transmitter power is adjusted to correct itself as quickly as the transmitter equalization process is performed.

The terms and expressions that are used herein are terms of expression and not of limitation. There is no intention in the use of such terms and expressions of excluding the equivalents of the features shown and described, or portions thereof, it being recognized that various modifications are possible in the scope of the invention.

What is claimed is:

1. An equalization system for equalizing forward and reverse channels of a network, comprising:
   a central node that is capable of receiving and broadcasting signals on the network;
   a network bus for transmitting signals to, and receiving signals from, the central node; and
   a plurality of network nodes connected to network bus, each of the network nodes being capable of communicating with each of the other network nodes over the network bus via the central node, each network node including at least,
      a transmitter capable of transmitting a transmitter equalization signal for adjusting the transmitter to provide a signal of predetermined characteristics to the central node and transmitting receiver equalization signals for adjusting received signals to have a predetermined signal quality,
      a receiver that is capable of receiving a receiver equalization signal transmitted by a transmitter of a predetermined network node and receiving a transmitter equalization signal transmitted by the transmitter associated with said receiver, and
      processing means for comparing the received receiver equalization signal with a first stored signal and determining an adjustment for the receiver for forward channel equalization, and/or comparing the received transmitter equalization signal with a second stored signal and determining an adjustment for the transmitter for reverse channel equalization.

2. The system of claim 1, wherein the adjustment for a transmitter is for pre-distorting signals to be transmitted therefrom.

3. The system of claim 1, wherein the predetermined network node is a reference node.

4. The system of claim 1, wherein the transmitter includes an output amplifier that connects to the network bus, a D/A converter that has an output connected to the input of the output amplifier, a modulator that provides an input to the D/A converter, an oscillator for providing a signal carrier input to the modulator, and first filter means for providing a data input to the modulator, the output of the modulator being the signal carrier modulated with the data.

5. The system of claim 4, wherein the first filter means is an FIR filter.

6. The system of claim 1, wherein transmitter equalization signal is a frequency-rich signal.

7. The system of claim 1, wherein the receiver equalization signal is a frequency-rich signal.

8. The system of claim 1, wherein the receiver includes an A/D converter for receiving signals from the network bus, a second filter means for receiving the output from the A/D converter, a demodulator for receiving and demodulating signals output from the second filter means, first storage means for storing samples from the A/D converter.

9. The system of claim 8, wherein the second filter means is an FIR filter.

10. The system of claim 1, wherein the processing means includes second storage means for storing predetermined samples as the second stored signal.

11. A method for equalizing transmissions on forward channels of a network having at least a central node, a network bus, and a plurality of network nodes, each network node having at least a transmitter, a receiver, and a processor, the method comprising steps of:

(a) a transmitter of a predetermined network node transmitting a predetermined receiver equalization signal to the central node;
   (b) the central node retransmitting the receiver equalization signal on the network to the plurality of network nodes;
   (c) the receiver at each network node receiving the receiver equalization signal from the central node; and
   (d) the processor adjusting the receiver based on a comparison of the received receiver equalization signal and the predetermined receiver equalization signal to compensate for transmission distortions on the network bus from the central node to the network node.

12. The method of claim 11, wherein the receiver equalization signal is a frequency-rich signal.

13. A method for equalizing transmissions on reverse channels of a network having at least a central node, a network bus, and a plurality of network nodes, each network node having at least a transmitter, a receiver, and a processor, the method comprising the steps of:

(a) the transmitter transmitting a transmitter equalization signal to the central node;
   (b) the central node retransmitting the transmitter equalization signal on the network bus;
   (c) the receiver associated with the transmitter receiving the transmitter equalization signal retransmitted by the central node; and
   (d) the processor adjusting the transmitter based on a comparison of the transmitted and received transmitter equalization signals to compensate for distortions on the network bus from the network node to the central node.

14. The method of claim 13, wherein the transmitter equalization signal is a frequency-rich signal.

15. The method of claim 13, wherein adjusting the transmitter includes adjusting the transmitter to pre-distort transmitted signals based on the comparison.

16. A method for equalizing transmissions on forward and reverse channels of a network having at least a central node, a network bus, and a plurality of network nodes, each network node having at least a transmitter, receiver, and a processor, the method comprising steps of:

(a) a transmitter of a predetermined network node transmitting a predetermined receiver equalization signal to the central node;
   (b) the central node retransmitting the receiver equalization signal on the network bus;
   (c) each receiver receiving the receiver equalization signal from the central node;
   (d) each network node processor adjusting its respective receiver based on a comparison of the received receiver equalization signal and the predetermined receiver equalization signal to compensate for distortions in transmissions on the network bus from the central node to the network node;
   (e) for each network node, the transmitter transmitting a transmitter equalization signal to the central node;
   (f) the central node retransmitting the transmitter equalization signal on the network bus;
   (g) for each network node, the receiver associated with each transmitter receiving the transmitter equalization signal retransmitted by the central node; and
   (h) for each network node, the processor adjusting the respective transmitter based on a comparison of the transmitted and received transmitter equalization signals.

17. The method of claim 16, wherein the receiver equalization signal is a frequency-rich signal.

18. The method of claim 16, wherein the transmitter equalization signal is a frequency-rich signal.

19. The method of claim 16, wherein adjusting the transmitter includes adjusting the transmitter to pre-distort transmitted signals based on the comparison.

* * * * *